(12) United States Patent
Johnson et al.

(10) Patent No.: US 6,258,332 B1
(45) Date of Patent: Jul. 10, 2001

(54) APPARATUS AND METHOD FOR COLLECTING AND RECYCLING A PETROLEUM BY-PRODUCT

(75) Inventors: George W. Johnson, Palos Verdes Estates; John P Nakamura, Long Beach, both of CA (US)

(73) Assignee: Atlantic Richfield Company, Chicago, IL (US)

( * ) Notice: Subject to any disclaimer, the term of this patent is extended or adjusted under 35 U.S.C. 154(b) by 0 days.

(21) Appl. No.: 09/311,232

(22) Filed: May 13, 1999

(51) Int. Cl.[7] .................................................. B01D 1/14
(52) U.S. Cl. ...................... 422/285; 196/14.52; 208/179; 210/177; 210/198.1; 210/250
(58) Field of Search ................................. 196/14.52, 46; 210/198.1, 246, 250, 177; 422/285; 208/179

(56) References Cited

U.S. PATENT DOCUMENTS

| | | | |
|---|---|---|---|
| 3,893,656 | * | 7/1975 | Opacic et al. ............................ 259/7 |
| 4,159,949 | * | 7/1979 | Oden ..................................... 210/180 |
| 4,428,200 | * | 1/1984 | McCabe et al. ..................... 60/641.5 |
| 4,948,493 | * | 8/1990 | Wilson ................................. 208/179 |
| 5,306,351 | * | 4/1994 | Anderson ............................... 134/40 |
| 5,476,994 | * | 12/1995 | Trezek ................................. 588/256 |
| 5,531,188 | * | 7/1996 | Tomasulo .............................. 122/379 |
| 5,630,912 | * | 5/1997 | LeFebvre .............................. 196/115 |
| 5,711,856 | * | 1/1998 | Nakajima ........................... 196/14.52 |

OTHER PUBLICATIONS

Petroleum Refinery Engineering, Chemical Engineering Series, Chapter XXVII "Solvent Treating or Extraction Processes," pp. 616–646, McGraw–Hill Book Co., 1941.

* cited by examiner

Primary Examiner—Bekir L. Yildirim
(74) Attorney, Agent, or Firm—Ekkehard Schoettle (57) ABSTRACT

The present invention provides for an apparatus and method for collecting and recycling a petroleum by-product such as hydrocarbon residue from crude oil. The apparatus comprises a container having a top, bottom, and sides, an internal heating element, an inlet element, an outlet element, a pump connector, and optionally a plug element for an auxiliary connector. The present invention further provides a method for recycling waxy hydrocarbon residue from crude oil. The method comprises providing the container of the present invention; filling the container with a sufficient amount of the waxy hydrocarbon residue; heating the waxy hydrocarbon residue in the container in order to produce a liquefied hydrocarbon residue; pumping the liquefied hydrocarbon residue out of the container through the pump connector and into a separate storage vessel; and, recycling the liquefied hydrocarbon residue into a usable oil refinery product.

9 Claims, 6 Drawing Sheets

APPARATUS AND METHOD FOR COLLECTING AND RECYCLING A PETROLEUM BY-PRODUCT

BACKGROUND

The present invention relates to an apparatus and method for collecting and recycling a petroleum by-product. In particular, the present invention relates to a container or bin having a heating element and also relates to a method using the container or bin for collecting and recycling petroleum by-products, such as hydrocarbon residue from crude oil, hydrocarbon residue from petroleum based products, sulfur, and other by-products.

Certain types of crude oil, such as Alaskan North Slope crude oil, and certain types of petroleum based products contain a hydrocarbon component that over time settles out and accumulates in vessels, such as ships for transporting crude oil, storage tanks for housing crude oil, crude oil pipelines, and other types of storage or transport vessels for petroleum or crude oil that are used in the petroleum industry. This hydrocarbon component is typically in the form of a waxy or wax-like solid material. Once this hydrocarbon component settles out from the crude oil or petroleum material and accumulates in a storage tank, it is very difficult to remove or recover. Such storage tanks or vessels that contain the crude oil or petroleum product are commonly found on ships, at terminals, and at refineries.

It is often necessary that the ships used to carry petroleum or crude oil, as well as the petroleum or crude oil storage tanks, undergo a complete and thorough cleaning. Such complete and thorough cleaning, which includes the removal or recovery of hydrocarbon residues from the ships and storage tanks, often occurs prior to a Critical Area Inspection Program (CAIP), prior to unplanned or necessary tank repairs, prior to sale or storage of a ship or tank, prior to a product change in a ship or tank, or prior to the docking or storing of a ship at a shipyard. Currently, the expense and time involved in the recovery and disposal of hydrocarbon residues from all of these various cleaning operations is very high. In addition, the ships must be cleaned, and in particular, prior to docking or storing at the shipyard, because often there is much welding and repair taking place at the shipyard and the potential for electrical fires or explosions is high. When the ships or storage tanks are cleaned, it is desirable that substantially all of the hydrocarbon residue be removed from the ships or storage tanks in order to eliminate the potential risk of fires or explosions.

Known containers for storing hydrocarbon residue collected from clean-up operations on ships and at refineries typically include 55 gallon steel cylindrical drum containers. However, due to the limited size of these containers, numerous containers, typically 200 or more containers, must be used in a standard clean-up operation. The more containers that are used in collection of the residue, the greater the expense in purchasing the containers, in handling and transporting the containers, and in disposing of the containers. In addition, the more containers that are used, the greater the time involved in loading, unloading, and transporting the containers. Moreover, the 55 gallon drum containers typically cannot be reused without extensive cleaning procedures as required by the Department of Transportation. Such cleaning procedures typically include triple rinsing, the use of steam, and the use of a cleaning solution. This increases labor, materials, transport, and handling costs.

Other known containers for storing hydrocarbon residue collected from clean-up operations on ships and at refineries include cardboard boxes lined with polypropylene, steel roll-off bins, and canvas bags. However, neither these known containers nor the 55 gallon drum containers are equipped with heating elements for processing the hydrocarbon residue into a recyclable product. Rather, the hydrocarbon residue collected in these known containers must be transferred to another vessel specially equipped with a heating element for processing. Such vessel may include a portable sealable tank equipped with a heating element, such as a Baker tank from Baker Tank of Southgate, Calif. However, such tanks must typically be rented or obtained from another source and the availability of such tanks may be a problem. In addition, the hydrocarbon residue in these known containers must be transported to the available tanks for processing. This increases handling, labor, and transportation costs.

In addition, known methods for removing hydrocarbon residue or petroleum based residue from petroleum tanks exist. For example, crude oil washing machines are typically used to clean storage tanks to remove or recover hydrocarbon residue. However, a difficulty with known crude oil washing machines is that they do not recover 100% of the hydrocarbon residue. In many ship designs, crude oil washing machines typically only remove or recover up to 85% of the hydrocarbon residue. Due to the internal structure of the storage tanks, numerous "shadow areas" exist in the tanks, i.e., in corners and areas where the crude oil washing machines cannot reach. Thus, the hydrocarbon residue accumulated in these "shadow areas" is not removed or recovered, leaving the potential risk of fire or explosion.

Such known methods for removing and disposing of hydrocarbon residue are costly and time consuming. Removing the hydrocarbon residue from a single crude oil storage tank, which may typically hold up to 500,000 barrels of oil, sludge, gasoline, water, hydrocarbons, or other types of materials, may take several days to remove and can be extremely costly. The typical amount of time it takes to remove the hydrocarbon residue from the ship and tanks may take up to a month. In addition, the expense involved in removing the hydrocarbon residue from the tank may easily cost several hundred thousand dollars per ship or refinery. Moreover, once the hydrocarbon residue has been removed from the tank, there are additional costs and time involved in handling and transporting the hydrocarbon residue to another location at a distant site, and in particular, if the hydrocarbon residue is treated as a waste stream product. There are also additional costs involved in disposing of the hydrocarbon residue, such as costs for waste incineration at a federally approved treatment facility and transportation costs. Moreover, there are issues of potential liability for disposal of waste stream products at federally approved treatment facilities.

In addition, known methods for removing hydrocarbon residue from storage tanks often involve disposing of the hydrocarbon residue into a waste stream rather than converting or recycling the hydrocarbon residue into a usable refinery product. Such disposal of hydrocarbon residues or other petroleum residues into a waste stream has the potential for contaminating land or water environments, and in turn, has the potential for creating liability problems for the entity disposing of the hydrocarbon residue as waste.

Accordingly, there is a need for a container or bin for collecting and recycling a petroleum by-product, such as hydrocarbon residue from crude oil, hydrocarbon residue from petroleum based products, sulfur, and other by-products. In particular, there is a need for such a container or bin that decreases the use, labor, handling, and transport costs associated with known containers; that has a greater volume capacity than known 55 gallon drum containers; that is reusable and has a long use life; that does not require expensive cleaning procedures after use and thus decreases the labor and materials costs associated with cleaning known containers; that is designed for use on tanker ships; that is easily transported from tanker ships to refineries or other locations; that is designed to be within the limits of dockside cranes and pallet jacks; and that includes an internal heating element so that the hydrocarbon residue or petroleum by-product can be processed directly in the container or bin, thus eliminating the need for a specially equipped portable tank that must be rented or made available for processing the hydrocarbon residue and thus decreasing the costs of labor, handling, and processing.

In addition, there is a need for a method for collecting all or substantially all of the hydrocarbon residue from a clean-up operation of a ship or refinery after being initially cleaned with known washing methods and machines, such that there is a decrease or elimination of the potential risk of fire or explosion; that decreases the overall time for removal and disposal of the hydrocarbon residue; that decreases or eliminates the handling, labor, transport, and disposal of the hydrocarbon residue to another location or processing vessel once it is removed from the ship or refinery, and thus decreases the associated time and expense involved; that allows for recycling of the hydrocarbon residue from a waste stream product to a usable refinery product; and, that eliminates potential liability for environmental contamination due to the disposal of the waste stream product, and in particular, the potential liability involved with disposal at federally approved treatment facilities.

The present invention satisfies these needs and provides all of these advantages over known apparatuses and methods for collecting and recycling of petroleum by-products.

SUMMARY

The present invention relates to an apparatus and method for collecting and recycling various petroleum by-products. In particular, the present invention relates to a container or bin having a heating element and a method using the container or bin for collecting and recycling petroleum by-products, such as hydrocarbon residue from crude oil, hydrocarbon residue from petroleum based products, sulfur, and other by-products. The present invention has numerous advantages over known containers and methods.

The present invention provides for a container for collecting and processing a petroleum by-product. The container comprises a removable top portion having an interior surface and an exterior surface, having a vent opening coupled to and extending upwardly from the exterior surface, and having a plurality of latches attached to the exterior surface. The container further comprises a bottom portion opposite the top portion, the bottom portion having an interior surface and an exterior surface, and having a plurality of legs coupled to and extending downwardly from the exterior surface. The container further comprises four sides coupled to and disposed between the top portion and the bottom portion, wherein the four sides form a substantially rectangular configuration, and wherein the four sides each have an interior side surface and an exterior side surface. The container further comprises a heating element coupled to and spaced above the interior surface of the bottom portion of the container, the heating element having a first end and a second end. The container further comprises an inlet element and an outlet element, both coupled to a lower portion of one of the exterior side surfaces of the container, the inlet element connected to the first end of the heating element via an inlet opening and the outlet element connected to the second end of the heating element via an outlet opening, wherein the inlet element and the outlet element are both adapted for connection to a separate steam source. The container further comprises a pump connector positioned between the inlet element and the outlet element and coupled to the lower portion of the exterior side surface via a pump connector opening, the pump connector adapted for connection to a pump system for pumping the processed petroleum by-product out of the container to a separate storage vessel. The container may further comprise a plug element positioned between the inlet element and the pump connector and coupled to the lower portion of the exterior side surface via a plug element opening, wherein the plug element may be removed and an auxiliary connector may be coupled to the plug element opening, the auxiliary connector being adapted for connection to a recirculation pipe system.

The present invention further provides a method for recycling waxy hydrocarbon residue from crude oil. The method comprises providing the container of the present invention as discussed above; filling the container with a sufficient amount of the waxy hydrocarbon residue; heating the waxy hydrocarbon residue in the container at a temperature in the range of from about 150 degrees F. to about 180 degrees F., for a period of time in the range of from about 15 minutes to about 45 minutes, using steam in a pressure range of from about 25 psi to about 150 psi, in order to produce a liquefied hydrocarbon residue; pumping the liquefied hydrocarbon residue out of the container through the pump connector and into the separate storage vessel; and, recycling the liquefied hydrocarbon residue into a usable oil refinery product.

These and other features, aspects, and advantages of the present invention will become better understood with reference to the following description, appended claims, and accompanying drawings.

DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

The present invention relates to an apparatus and method for collecting and recycling a petroleum by-product. In particular, the present invention relates to a container or bin having a heating element and also relates to a method using the container or bin for collecting and recycling petroleum by-products, such as hydrocarbon residue from crude oil, hydrocarbon residue from petroleum based products, sulfur, and other by-products.

In one application, the apparatus of the present invention may be used to collect and recycle a waxy hydrocarbon residue from crude oil. The hydrocarbon residue is typically a solid heavy waxy material that settles out from various types of crude oil, such as Alaskan North Slope Crude Oil, which is collected, transported and stored on oil tanker ships. The hydrocarbon residue may be collected in various ways, such as from clean-up operations of oil tankers, barges and petroleum storage vessels, from oil pipelines, and from other clean-up operations at refineries. The typical composition of the hydrocarbon residue used in the present invention comprises the following (all of the components are weight percents of the total composition): 0% to 25% (by weight of the total composition) water; 70% to 100% (by weight of the total composition) hydrocarbons; and 0% to 5% (by weight of the total composition) inorganic solids. As set forth in Example I, the typical composition comprises 16% by weight water, 81% by weight hydrocarbons, and 3% by weight inorganic solids. Typical hydrocarbons found in the composition include pentane insolubles, saturates, aromatics, and polars. Typical inorganic solids found in the composition include aluminosilicates, dirts, clays, and scale.

Typically, the oil tankers or refinery vessels are initially cleaned with known crude oil washing machines which clean and dispose of up to about 85% of the hydrocarbon residue. Crude oil washing machines are typically part of a ship's equipment, and cleaning is usually performed during cargo discharge of the ship. A typical crude oil washing machine used is one obtained from Victor Pyrate Inc. of Houston, Tex. However, due to the internal structure of the tanks, numerous "shadow areas" exist where the crude oil washing machines cannot reach and the hydrocarbon residue is not removed. For purposes of this invention, the remaining hydrocarbon residue accumulated in these "shadow areas" of the oil tanker or vessel is recovered, collected, and provided for use in the method of the present invention. In order to remove and collect the hydrocarbon residue that is not removed with conventional crude oil washing machines, the hydrocarbon residue is typically collected by using a scraping device such as a knife, shovel, pole, or other suitable device, to manually scrape the remaining hydrocarbon residue off the sides, bottoms, and other interior portions of a standard oil tanker or vessel where the hydrocarbon residue has accumulated.

The apparatus of the present invention is designed to store the hydrocarbon residue once it is collected and is also designed to process the hydrocarbon residue. The apparatus is designed for use on an oil tanker or at a refinery and is of a suitable size for such use. The apparatus is further designed to be within the size limitations of dockside cranes and pallet jacks, so that the apparatus can be easily moved and transported to a reservoir site. Further, the apparatus of the present invention has an increased holding capacity over known 55 gallon drum containers, and the apparatus of the present invention is reusable and has a long use life.

Figure 1:
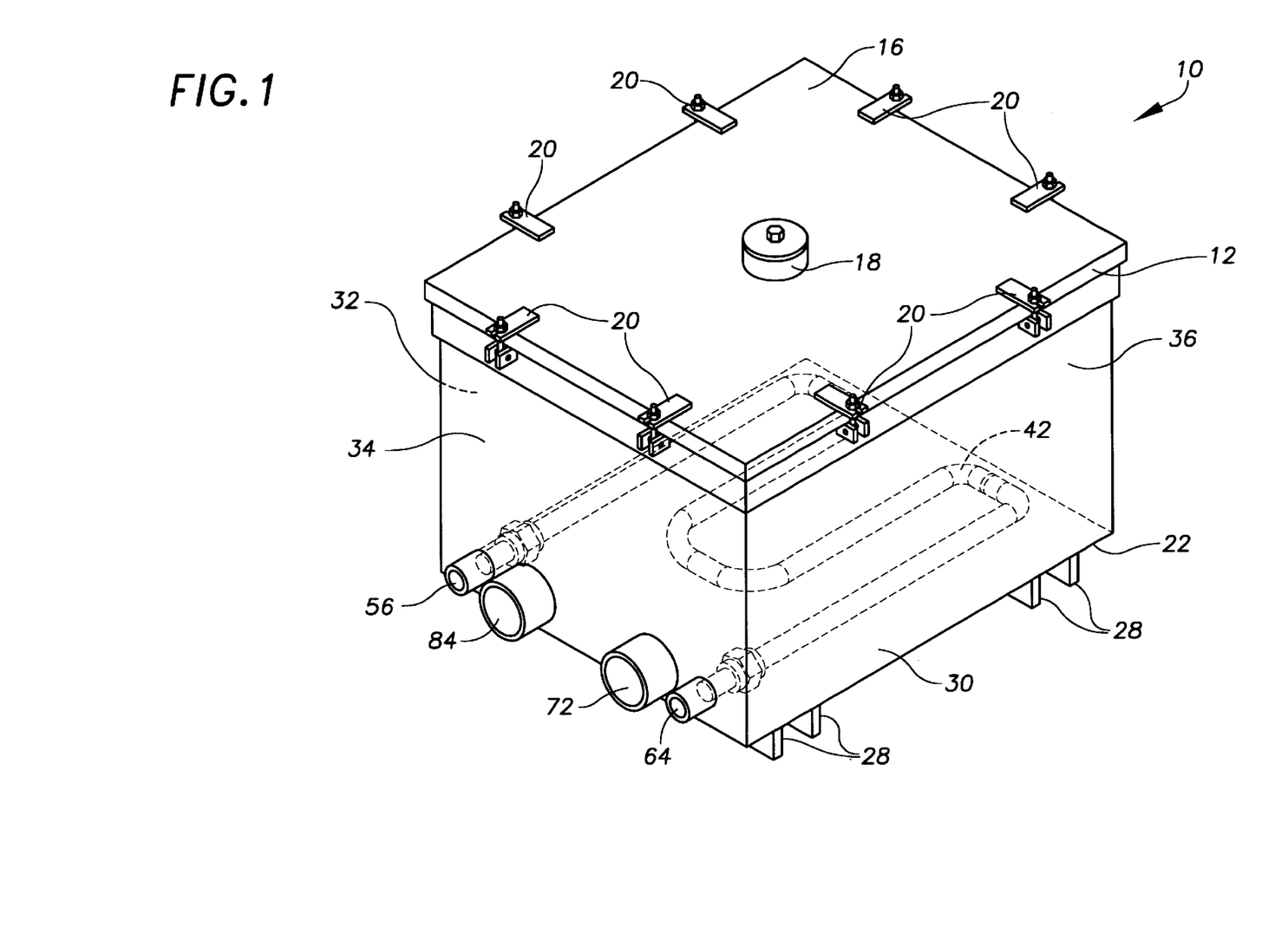
FIG. 1 shows a perspective view of the container apparatus of the present invention.
Figure 2:
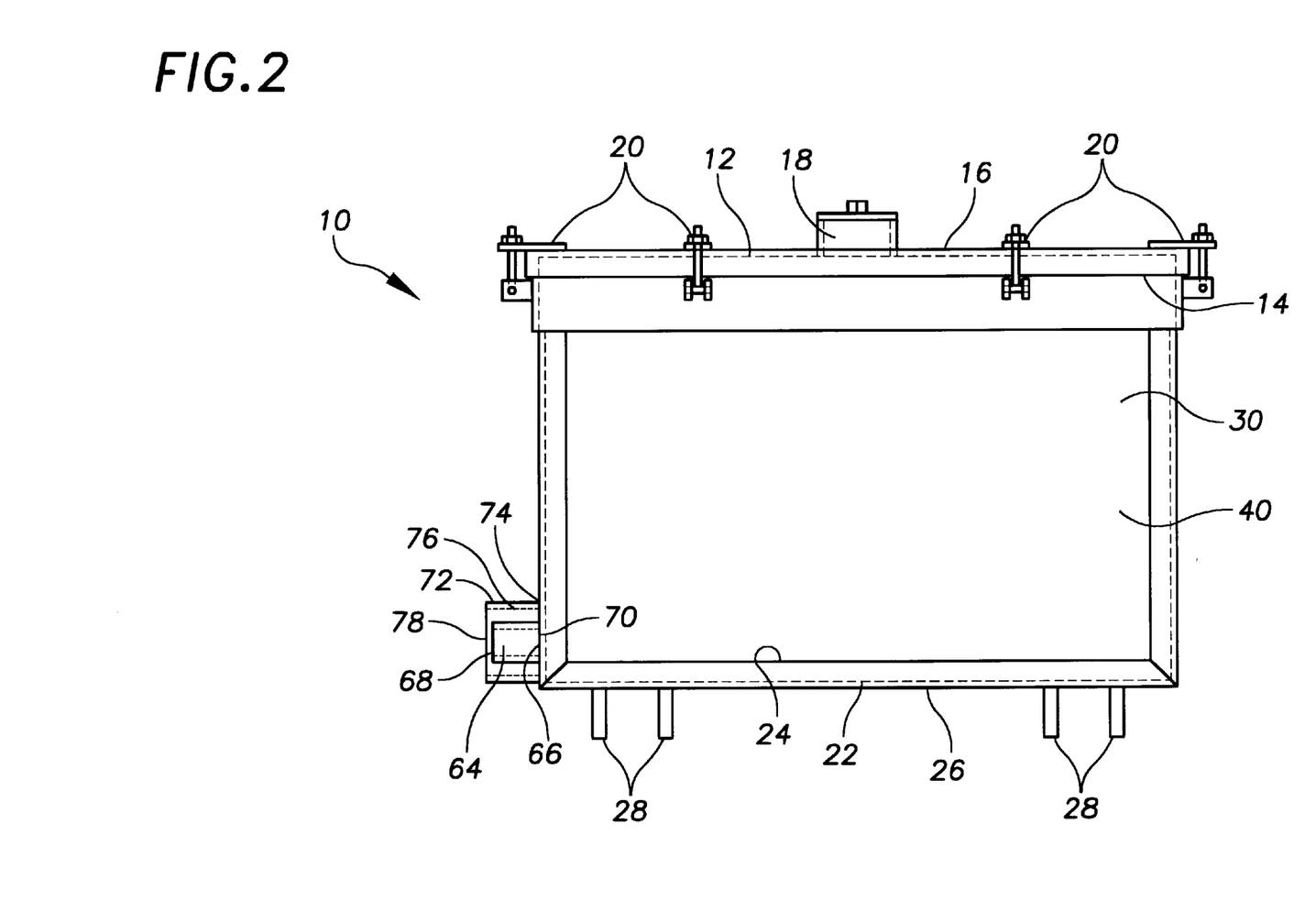
FIG. 2 shows a front view of the container apparatus of the present invention.

As shown in FIGS. 1 and 2, the apparatus of the present invention comprises a container or bin 10. Preferably, the container 10 is of a welded carbon steel construction. However, the container 10 may also be comprised of other suitably sturdy materials. The container 10 has a capacity of 36 cubic feet. The container 10 preferably holds a volume of up to 330 gallons. Known containers typically hold 55 gallons. Thus, the container 10 of the present invention has an increased holding capacity of up to 6 times that of a typical 55 gallon drum container. In a typical clean-up operation of an oil tanker ship that is used to transport and store crude oil, numerous drums of hydrocarbon residue, typically in the amount of 200 or more 55 gallon steel drums, may be generated. Thus, the container 10 of the present invention has an increased holding capability and decreases the number of container bins that have to be used to collect the hydrocarbon residue. Once the hydrocarbon residue is collected in the container 10, it may be stored for a time period of from several days to several weeks or it can be processed immediately.

The container 10 containing the hydrocarbon residue may be used to process the hydrocarbon residue directly on the oil tanker or may be removed from the oil tanker and transported via truck or train to a refinery, a terminal, or another desired location for processing. Preferably, the container 10 is transported to a refinery for processing.

Figure 3:
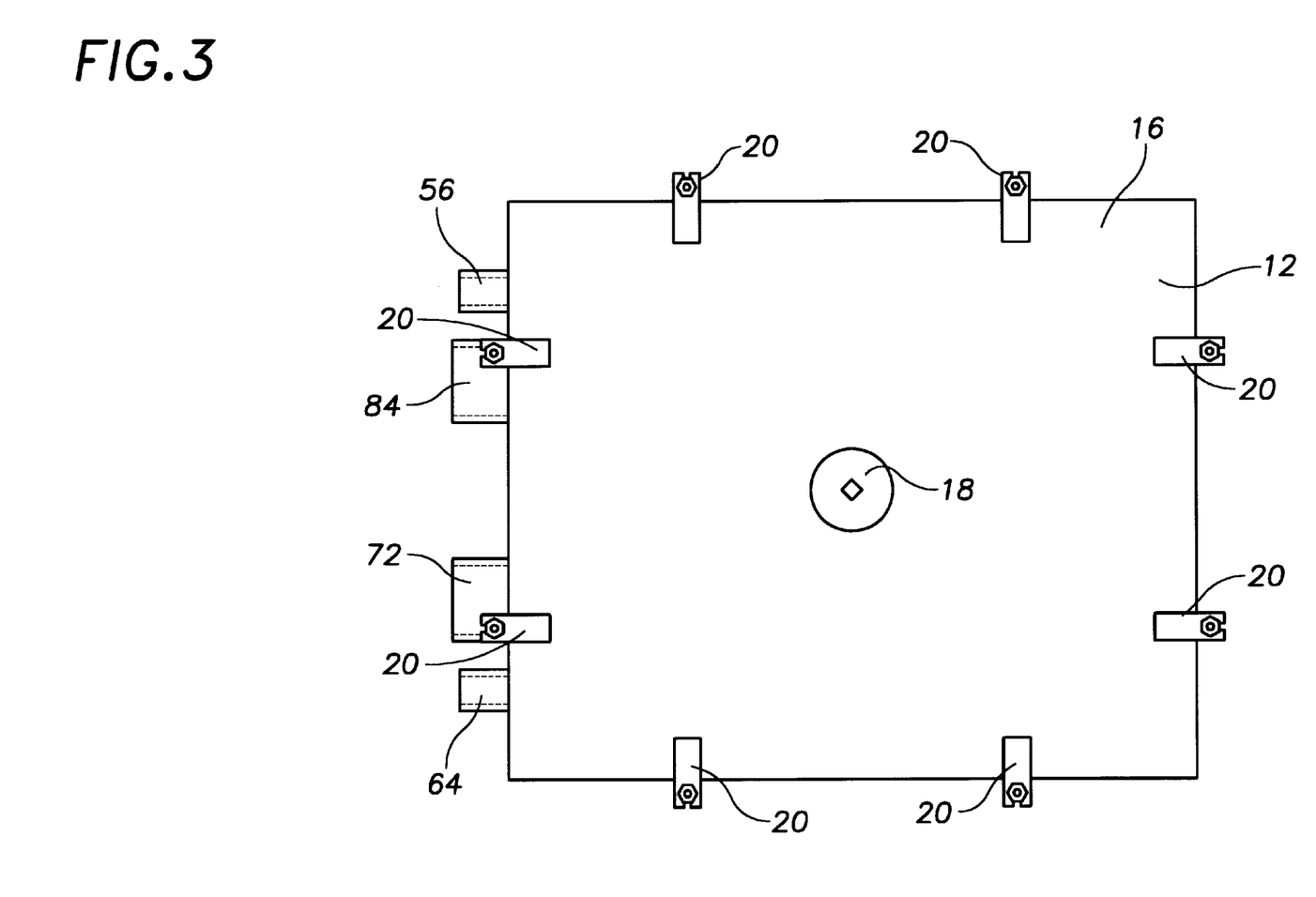
FIG. 3 shows a right side view of the container apparatus of the present invention.

As shown in FIGS. 2 and 3, the container 10 is sealable and comprises a removable top portion 12 having an interior surface 14 and an exterior surface 16. The top portion 12 is substantially rectangular in shape and has a length of at least 48 inches and a width of at least 40 inches. The top portion 12 preferably has a thickness of from about ⅛ inch to about ¼ inch. The top portion 12 has a vent opening 18 coupled to and extending upwardly from the exterior surface 16. The vent opening 18 is preferably centered on the top portion 12 and preferably comprises a female portion threadedly connected to a male portion The purpose of the vent opening 18 is for vapor recovery, if necessary. The top portion 12 also has a plurality of latches 20 attached to the exterior surface 16. The latches 20 are preferably comprised of swing bolts with locking nuts and are made of carbon steel. The number of latches 20 attached to the top portion is at least 4. Preferably, the number of latches attached to the top portion is 8. The purpose of the latches 20 is to allow an operator of the container 10 to open and sealingly close the top portion 12 of the container 10.

The container 10 further comprises a bottom portion 22 positioned opposite the top portion 12. The bottom portion 22 has an interior surface 24 and an exterior surface 26. The bottom portion 22 has a length of at least 48 inches and a width of at least 32 inches. The bottom portion 22 preferably has a thickness of from about ⅛ inch to about ¼ inch. The bottom portion 22 further has a plurality of legs 28 coupled to and extending downwardly from the exterior surface 26. Each leg 28 extends across the width of the exterior surface 26 of the bottom portion 22, and each leg is comprised of carbon steel. The height of each leg is about 2 inches to about 4 inches. The width of each leg is about 40 inches, the width of the container. Preferably, the bottom portion 22 has at least 4 legs. The purpose of the legs 28 is to raise the container 10 off of the ground and provide a space between the bottom portion of the container and the ground so that a forklift or pallet jack can be positioned under the container for lifting.

The container 10 further comprises a front side 30, a back side 32, a left side 34, and a right side 36. The four sides 30, 32, 34, 36 are closed and are coupled to via welding and disposed between the top portion 12 and the bottom portion 22. The four sides 30, 32, 34, 36 form a substantially rectangular configuration around a substantially hollow interior of the container 10. The four sides 30, 32, 34, 36 preferably have a thickness of from about ⅛ inch to about ¼ inch. The four sides 30, 32, 34, 36 each have an interior side surface 38 and an exterior side surface 40. The length across of sides 30, 32 is at least 48 inches, and the height of sides 30, 32 is at least 32 inches. The length across of sides 34, 36 is at least 40 inches, and the height of sides 34, 36 is at least 32 inches.

Figure 5:
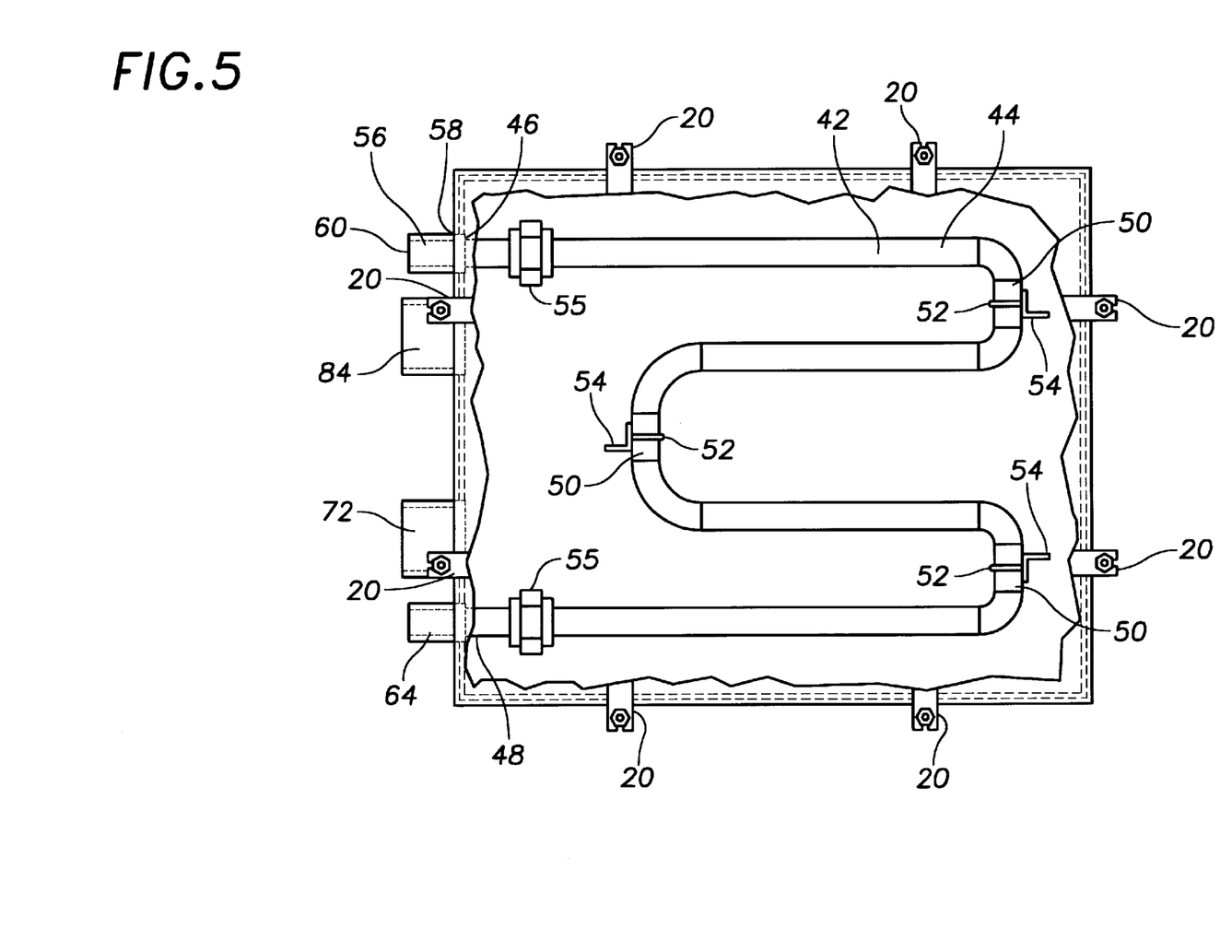
FIG. 5 shows a top view of the interior bottom of the container apparatus of the present invention and the internal heating system; and, FIG. 6 shows a schematic diagram of one version of the method of the present invention.

As shown in FIG. 5, the container 10 further comprises a heating element 42 coupled to and spaced above the interior surface 24 of the bottom portion 22 of the container. The heating element 42 comprises a steel pipe 44 comprised of welded steel and having substantially curved portions. Preferably, the steel pipe 44 has three substantially curved portions. The steel pipe 44 has a first end 46 and a second end 48. Preferably, the steel pipe 44 further has an internal plurality of steam coils (not shown) within the steel pipe so that steam that is generated flows through the coils, and in turn, heats the contents in the container 10. The steel pipe 44 further has a plurality of pipe support elements 50. Preferably, the pipe support elements 50 are attached at each curve of the steel pipe 44, and preferably, the number of pipe support elements is three. Each pipe support element 50 preferably comprises a U-bolt 52 that is attached around a portion of the steel pipe 44 and that is further attached to an L-shaped steel portion 54 having a height of about 1 inch. The purpose of the pipe support elements 50 is to support and raise the steel pipe 44 about 1 inch above the interior surface of the bottom portion of the container, so that the steel pipe 44 is not in direct contact with the interior surface of the bottom portion. The steel pipe 44 may also have one or more couplings 55 attached to the steel pipe. The purpose of the couplings 55 is for pipe removal and/or maintenance.

Figure 4:
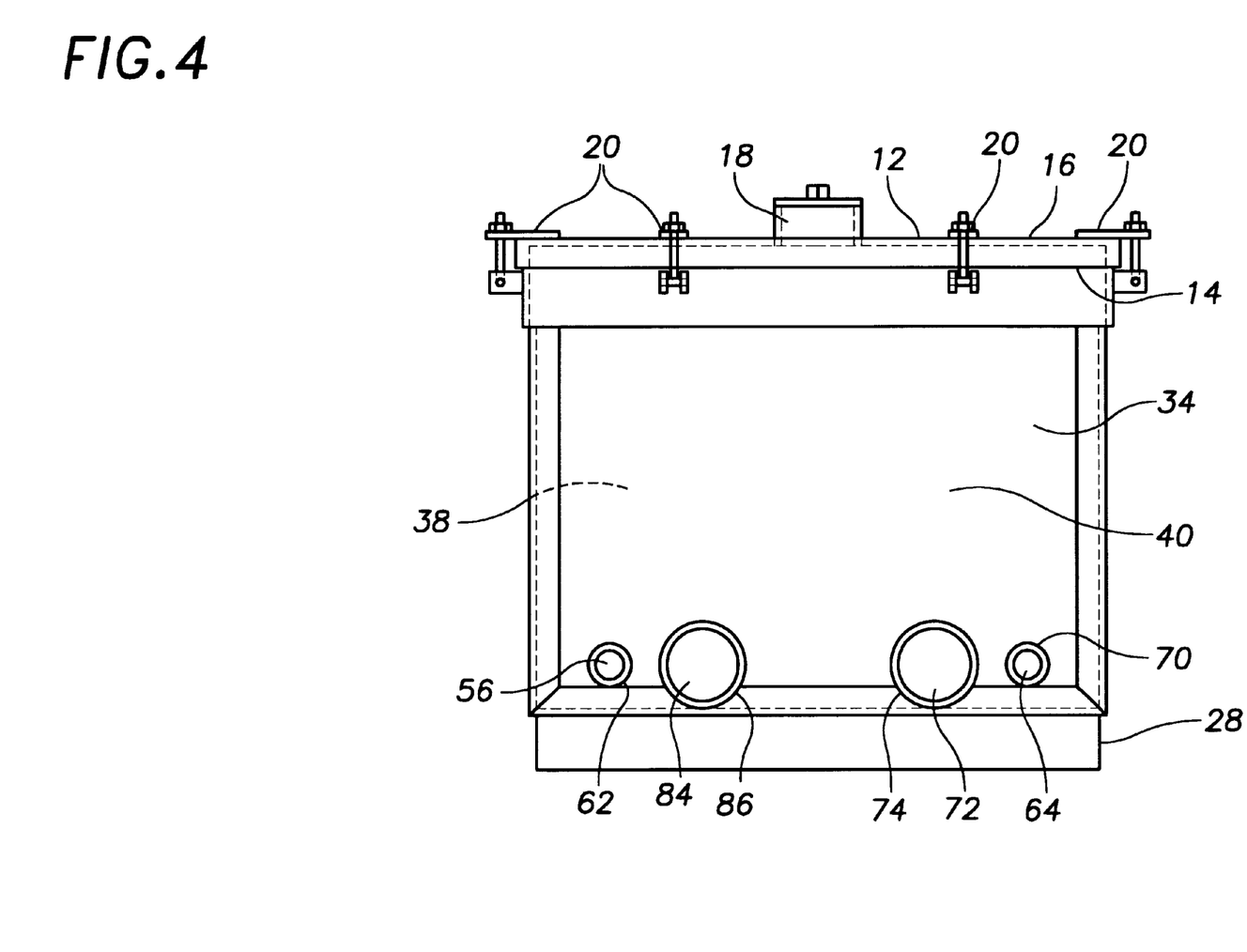
FIG. 4 shows a top view of the container apparatus of the present invention.

FIG. 4 shows a view of the left side 34 of the container. The container 10 further comprises an inlet element 56 coupled to the lower portion of the exterior side surface 40 of left side 34. The inlet element 56 has a first inlet end 58 and a second inlet end 60. The first inlet end 58 is connected to the first end 46 of the steel pipe 44 via an inlet opening 62 in the left side 34. The second inlet end 60 is adapted for connection to a heating source, preferably a steam source (not shown), via a steel pipe or rubber hose or tubing. Preferably, steam from the steam source is introduced and circulated into the steam inlet element 56 and provides a source of heat to the heating element 42. The container 10 further comprises an outlet element 64 coupled to the lower portion of the exterior side surface 40 of left side 34. The outlet element 64 has a first outlet end 66 and a second inlet end 68. The first outlet end 66 is connected to the second end 48 of the steel pipe 44 via an outlet opening 70 in the left side 34. The second outlet end 68 is adapted for connection to the same heating source as the second inlet end 60, preferably a steam source (not shown), via a steel pipe or rubber hose or tubing. Preferably, steam condensate from the heating element 42 is introduced into the outlet element 64 and is circulated back to the steam source.

The container 10 further comprises a pump connector 72 positioned between the inlet element 56 and the outlet element 64 and coupled to the lower portion of the exterior side surface 40 of the left side 34 via a pump connector opening 74 in the left side 34. The pump connector 72 has a first end 76 and a second end 78. The first end 76 of the pump connector 72 is coupled to the pump connector opening 74. The second end 78 of the pump connector 72 is adapted for connection to a pump system 80 (see FIG. 6) via a steel pipe or rubber hose or tubing. The pump system 80 pumps the processed petroleum by-product out of the container 10 to a separate storage vessel 82 (see FIG. 6). The pump system may be powered with an electrical power source having power of about 440 volts. The pump system may be controlled with one or more stop valves. The pump system may comprise a portable diesel driven pump such as one obtained from Godwin Pump of America of Bridgeport, N.J. Preferably, the pump system is located exterior to the container 10 and is controlled manually from the outside of the container.

Figure 6:
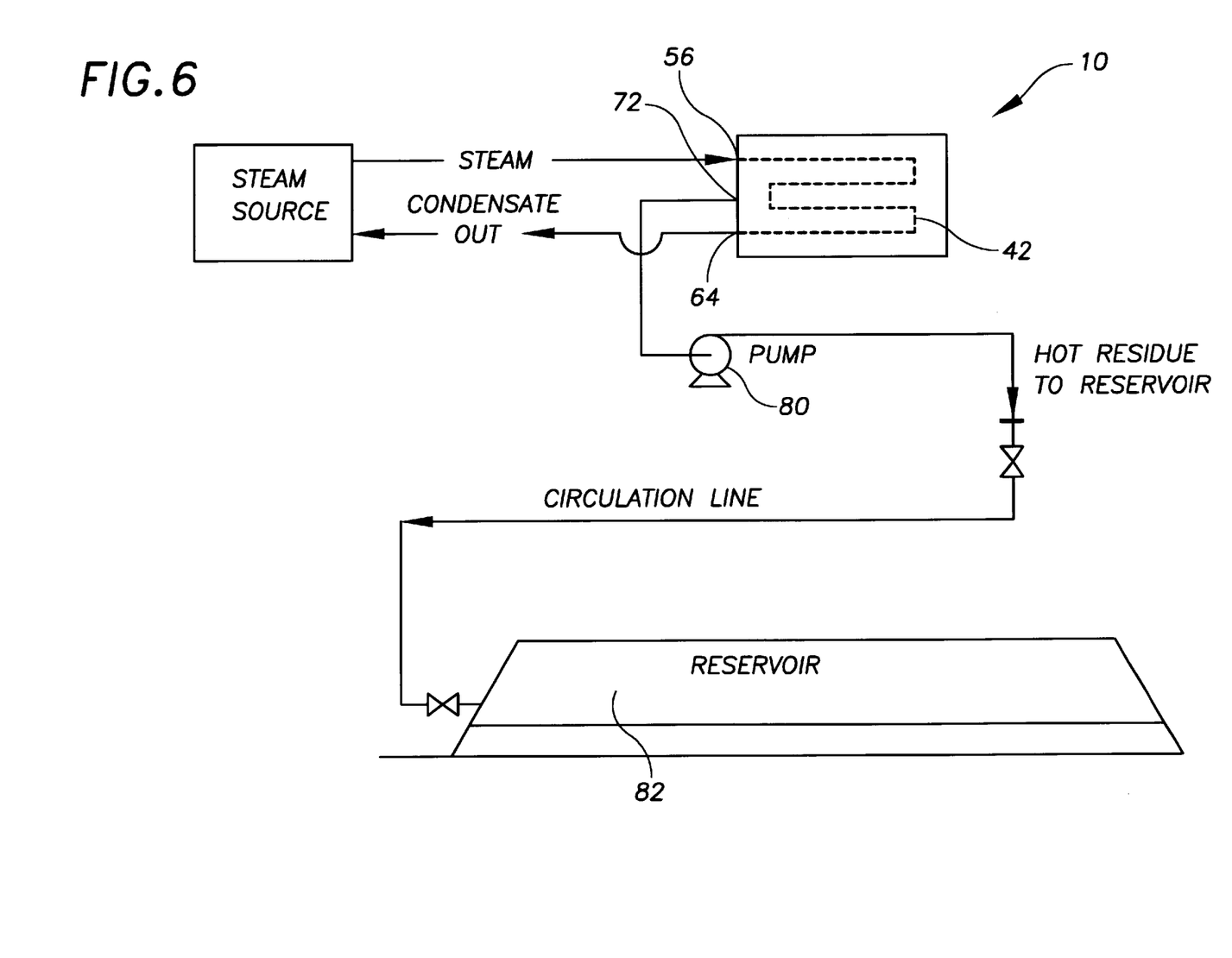

The storage vessel 82 may comprise a containment storage in-ground reservoir having a concrete lining, a steel storage tank, a concrete storage tank, a storage tank where part of the tank is above ground and part of the tank is below ground, or another suitable storage vessel. Preferably, the storage vessel is an in-ground reservoir having a concrete lining. The reservoir may have a roof or covering over it comprised of wood or another suitable material. The concrete lined reservoir preferably holds a volume of from about 20,000 barrels to about 2 million barrels. The container 10 is separate from the storage vessel 82. Preferably, the container 10 is located close to the storage vessel 82 so the processed hydrocarbon residue does not have to be pumped as far and thus the amount of power and energy utilized is less. Preferably, the container 10 is located at least 5 feet away from the storage vessel but less than 500 feet from the storage vessel.

The container 10 may further comprise a carbon cannister for vapor control. The container 10 may further comprise a temperature gauge located on the outside of the tank for indicating to the operator the temperature of the contents inside of the container 10.

As shown in FIG. 1, the container 10 may further optionally include a plug element 84 positioned between the inlet element 56 and the pump connector 72 and coupled to the lower portion of the exterior side surface 40 of the left side 34 via a plug element opening 86 in the left side 34. The plug element 84 may be removed and an auxiliary connector (not shown) may be coupled to the plug element opening 86. The auxiliary connector is adapted for connection to a recirculation pipe system (not shown) that may be used for draining, additional steam, water for rinsing out the tank, or other possible uses.

The present invention is also directed to a method for recycling a petroleum by-product such as waxy hydrocarbon residue from crude oil. The method comprises providing the container 10 as shown in FIG. 1. The container 10 is filled with a sufficient amount of a solid waxy hydrocarbon residue obtained from a clean-up operation on an oil tanker or at a refinery. Preferably, the amount of waxy hydrocarbon residue collected in the container is in the range of from about 220 gallons to about 550 gallons. Steam is then introduced from a steam source through the inlet element and into the heating element to heat the contents in the container. The waxy hydrocarbon residue is heated in the container at a temperature in the range of from about 150 degrees F. to about 180 degrees F. Preferably, the waxy hydrocarbon residue is heated at temperature of 180 degrees F. The waxy hydrocarbon residue is heated for a period of time in the range of from about 15 minutes to about 45 minutes. Preferably, the waxy hydrocarbon residue is heated for 30 minutes. During the heating process, the steam pressure in the pipe/heating coil is in the range of from about 25 psi to about 150 psi. Preferably, the steam pressure in the pipe/heating coil is at least 25 psi. The solid waxy hydrocarbon residue is sufficiently heated in order to produce a liquefied hydrocarbon residue.

Once the waxy hydrocarbon residue is sufficiently liquefied, the liquefied hydrocarbon residue is continuously pumped out of the container through the pump connector opening, through the pump connector, through the pump system which comprises a steel pipe, rubber hose, or rubber tubing, and a pump, and into the separate storage vessel. The liquefied hydrocarbon residue may be pumped out of the container 10 at a rate of from about 100 barrels per hour to about 200 barrels per hour. Preferably, the liquefied hydrocarbon residue is pumped out of the container 10 at rate of about 200 barrels per hour. The storage vessel is preferably a storage containment reservoir having a concrete lining, and having a capacity of from about 20,000 barrels to about 2 million barrels. The liquefied hydrocarbon residue is then recycled into a usable oil refinery product.

Once the liquefied hydrocarbon residue is pumped into the storage vessel, it can be stored for recycling for an indefinite period of time or it can be recycled fairly quickly such as within 2 hours. The liquefied hydrocarbon residue is preferably recycled or converted into a usable oil refinery product. With the present invention, the total time for processing the hydrocarbon residue into a usable oil refinery product is typically from about 1 hour to about 3 hours.

With the present invention, after the desired amount of liquefied hydrocarbon residue has been processed, a small amount of unprocessed material, such as sediment, may remain in the bottom of the container 10. This unprocessed material may be collected when the container 10 is cleaned and may be transferred into storage vessels such as cylinder drums or roll-off bins. This unprocessed material may be disposed of as a waste stream.

FIG. 6 shows a schematic diagram of one version of the method of the present invention. Steam is introduced from a steam source into the inlet element 56 and into the heating element 42, and the steam condensate flows out of the outlet element 64. The heating element 42 heats up the waxy hydrocarbon residue in the container 10 until it is sufficiently liquefied. The liquefied hydrocarbon residue is them pumped out of the container through the pump connector 72 and into the reservoir 82.

The container of the present invention may also be used to collect sulfur at the refinery, heat the sulfur, and liquefy it so that it can be pumped into a storage vessel at the refinery or into a storage vessel on a truck that is used to transport the sulfur to another location. The container of the present may also have applications for various other petroleum by-products.

EXAMPLE I

This Example describes how a version of the method of the present invention was conducted. Approximately 330 gallons of waxy hydrocarbon residue were collected in the container of the present invention from a clean-up operation on an oil tanker. The container was transported from the oil tanker to a refinery. The container was moved via a forklift to a site at the refinery near a gas oil reservoir. The valve for a 150 pound steam system connected to the container was opened and steam was introduced into the steam inlet from a steel pipe to heat the a steam coils within the steel pipe of the container's heating element. The waxy hydrocarbon residue was heated to approximately 180 degrees F. which took about 30 minutes. The temperature in the container was monitored using a temperature gauge mounted on the outside of the container. After the hydrocarbon residue was heated to 180 degrees F. Once the hydrocarbon residue was sufficiently heated, a portable diesel-driven pump was turned on, the valves from the container to the pump were opened, and the contents of the container were pumped out of the container to the gas oil reservoir. The liquid contents of the container, or approximately 6 barrels in the container, were pumped into the gas oil reservoir via the pump connector and pump system for approximately 5 minutes. No dirt or scale remained in the container after the process.

Although the present invention has been described in considerable detail with reference to certain preferred versions thereof, other versions are possible. Therefore, the scope of the appended claims should not be limited to the description of the preferred versions contained herein.

What is claimed is:

1. A container for collecting and processing a petroleum by-product, the container comprising:

a removable top portion having an interior surface and an exterior surface, having a vent opening coupled to and extending upwardly from the exterior surface, and having a plurality of latches attached to the exterior surface;

a bottom portion opposite the top portion, the bottom portion having an interior surface and an exterior surface, and having a plurality of legs coupled to and extending downwardly from the exterior surface;

four sides coupled to and disposed between the top portion and the bottom portion, wherein the four sides form a substantially rectangular configuration, and wherein the four sides each have an interior side surface and an exterior side surface;

a single heating element coupled to and spaced above the interior surface of the bottom portion of the container, the heating element comprising a first end and a second end and a body having a substantially curved configuration, wherein the body is sealed and has no openings and wherein the heating element body substantially covers the bottom portion of the container;

an inlet element and an outlet element, both coupled to a lower portion of one of the exterior side surfaces of the container, the inlet element connected to the first end of the heating element via an inlet opening and the outlet element connected to the second end of the heating element via an outlet opening, wherein the inlet element and the outlet element are both adapted for connection to a separate steam source; and, a pump connector positioned between the inlet element and the outlet element and coupled to the lower portion of the exterior side surface via a pump connector opening, the pump connector adapted for connection to a pump system for pumping the processed petroleum by-product out of the container to a separate storage vessel, and further wherein the container has a volume capacity up to 330 gallons.

2. The container of claim 1 further comprising a plug element positioned between the inlet element and the pump connector and coupled to the lower portion of the exterior side surface via a plug element opening, wherein the plug element may be removed and an auxiliary connector may be coupled to the plug element opening, the auxiliary connector being adapted for connection to a recirculation pipe system.

3. The container of claim 1 wherein the petroleum by-product is a waxy hydrocarbon residue.

4. The container of claim 1 wherein the petroleum by-product is sulfur.

5. The container of claim 1 wherein the heating element comprises steam coils within a steel pipe and wherein the steel pipe is coupled to a plurality of pipe support elements that support and raise the steel pipe above the interior surface of the bottom portion of the container.

6. The container of claim 1 wherein the separate, storage vessel is a storage containment reservoir having a concrete lining, and wherein the reservoir has a capacity of from about 20,000 barrels to about 2 million barrels.

7. The container of claim 1 wherein the container has a volume capacity in the range of from about 220 gallons to about 330 gallons.

8. A container bin for collecting and processing waxy hydrocarbon residue from crude oil, the container comprising:

- a removable top having an interior surface and an exterior surface, having a vent opening coupled to and extending upwardly from the exterior surface, and having a plurality of latch closures attached to the exterior surface;
- a bottom opposite the top, the bottom portion having an interior surface and an exterior surface, and the bottom having a plurality of legs coupled to and extending downwardly from the exterior surface;
- four sides coupled to and disposed between the top and the bottom, wherein the four sides form a substantially rectangular configuration around a substantially hollow interior, and wherein the four sides each have an interior surface and an exterior surface;
- a single heating element coupled to and spaced above the interior surface of the bottom of the container, the heating element comprising a steel pipe having a first end and a second end, and having a body with a substantially curved configuration, wherein the body is sealed and has no openings and wherein the heating element body substantially covers the bottom portion of the container and further wherein a plurality of steam coils is within the steel pipe, and a plurality of pipe support elements is coupled to the exterior of the steel pipe, wherein the pipe support elements support and raise the steel pipe above the interior surface of the bottom, and further wherein the heating element is used to liquefy the waxy hydrocarbon residue collected in the container bin;
- a steam inlet and a steam outlet, both coupled to a lower portion of one of the exterior side surfaces of the container, the steam inlet connected to the first end of the steel pipe via an inlet opening and the steam outlet connected to the second end of the steel pipe via an outlet opening, wherein the steam inlet and the steam outlet are both adapted for connection to a separate steam source; and,
- a pump connector coupled to the lower portion of the exterior side surface and positioned between the steam inlet and the steam outlet, the pump connector adapted for connection to a pump system for pumping the waxy hydrocarbon residue that is processed in the container bin out of the container bin and into a separate storage containment reservoir having a concrete lining,
- and further wherein the container bin has a volume capacity up to 330 gallons.

9. The container bin of claim 8 further comprising a plug element positioned between the steam inlet and the pump connector and coupled to the lower portion of the exterior side surface via a plug element opening, wherein the plug element may be removed and an auxiliary connector may be coupled to the plug element opening, the auxiliary connector being adapted for connection to a recirculation pipe system.

* * * * *